(12) United States Patent
Wieszt

(10) Patent No.: US 6,206,084 B1
(45) Date of Patent: Mar. 27, 2001

(54) CIRCUIT ARRANGEMENT FOR ACTUATING AN AIR-CONDITIONING SYSTEM OR AUTOMATIC AIR CONDITIONER IN A VEHICLE

(75) Inventor: Herbert Wieszt, Grafenau (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/199,574

(22) Filed: Nov. 25, 1998

(30) Foreign Application Priority Data

Nov. 26, 1997 (DE) .............................. 197 52 265

(51) Int. Cl.$^7$ .............................. F25B 29/00; B60H 1/00
(52) U.S. Cl. .............................. 165/11.1; 165/42; 165/43; 165/202; 165/203; 165/271; 236/11; 237/12.3 A; 237/12.3 B
(58) Field of Search .............................. 165/11.1, 42, 43, 165/202, 203, 271; 236/11; 237/12.3 A, 12.3 B

(56) References Cited

U.S. PATENT DOCUMENTS

| | | | |
|---|---|---|---|
| 4,659,880 | 4/1987 | Kondo et al. | 200/5 R |
| 4,762,169 * | 8/1988 | Andersen et al. | 165/43 |
| 4,858,518 | 8/1989 | Yamaguchi et al. | 98/2.08 |
| 5,209,397 * | 5/1993 | Arold et al. | 165/43 |
| 5,220,805 * | 6/1993 | Fukudomi | 165/42 |

FOREIGN PATENT DOCUMENTS

| | | |
|---|---|---|
| 42 14 178 C1 | 7/1993 | (DE) . |
| 44 30 484 A1 | 2/1996 | (DE) . |
| 0184621 A1 | 6/1986 | (EP) . |
| 002664540 * | 9/1992 | (FR) ............ 237/2 B |

* cited by examiner

Primary Examiner—John K. Ford
(74) Attorney, Agent, or Firm—Evenson, McKeown, Edwards & Lenahan, P.L.L.C.

(57) ABSTRACT

A circuit arrangement for actuating an air-conditioning system or an automatic air conditioner in a vehicle, in which it is possible to switch the air-conditioning system or automatic air conditioner on and off when the engine is operating. Here, the air-conditioning system or automatic air conditioner is switched off, if the air-conditioning system or automatic air conditioner is operating while the engine is operating and the engine is switched off. Further, the air-conditioning system or automatic air conditioner continues to possess a function with which, when the engine of the vehicle is stationary, the residual heat of the engine is utilizable. Additionally, at least one function of the air-conditioning system or automatic air conditioner, which is switchable manually when the engine is operating, is switchable via the same control element used to activate and deactivate the function in which the residual heat is utilized when the engine is stationary.

16 Claims, 1 Drawing Sheet

CIRCUIT ARRANGEMENT FOR ACTUATING AN AIR-CONDITIONING SYSTEM OR AUTOMATIC AIR CONDITIONER IN A VEHICLE

BACKGROUND AND SUMMARY OF THE INVENTION

The invention relates to a circuit arrangement for actuating an air-conditioning system or automatic air conditioner in a vehicle. Here, the air-conditioning system or automatic air conditioner can be switched on or off when the engine is operating. Moreover, the air-conditioning system or automatic air conditioner is switched off if the air-conditioning system or automatic air conditioner is switched on when the engine is operating and the engine is subsequently switched off. Additionally, when the engine of the vehicle is stationary, the air-conditioning system or automatic air conditioner continually possesses a function via which the residual heat of the engine is utilizable.

Presently, vehicles are being increasingly equipped with air-conditioning systems. Such air-conditioning systems have a compressor with which air can be cooled. In an air-conditioning system, the power of the compressor is directly set by the driver of the vehicle or an occupant of the vehicle. Here, it is the interior temperature of the vehicle which is controlled. If the temperature of the interior of the vehicle does not correspond to the expectations of the driver or the occupant, the driver or the occupant will change the power setting of the compressor appropriately.

The interior temperature of the vehicle is thus controlled in a closed-loop manner. Similarly, it is known to continuously control such an air-conditioning system in a closed-loop manner so that the air-conditioning system thus becomes an automatic air conditioner. In such an automatic air conditioner, the driver or the occupant of the vehicle must enter the interior temperature setpoint of the vehicle. Using at least one temperature sensor, the power of the compressor is then set in such a way that the temperature setpoint in the interior of the vehicle is maintained. Additionally, or as an alternative, a temperature is also maintained while taking into account other ambient conditions such as, for example, solar radiation. The driver or occupant of the vehicle can expect this temperature to corresponding to the setpoint temperature while accounting for the ambient condition.

Because of the comparatively large power requirement of the compressor, the operation of such an air-conditioning system or such an automatic air conditioner is permitted only if its power is provided by the engine for the vehicle. The air-conditioning system and/or the automatic air conditioner can therefore basically be switched on and off by the driver of the vehicle or an occupant of the vehicle. Here, it is possible to activate the air conditioning system and/or the automatic air conditioner only if the engine is running.

Moreover, it is also known to equip an air-conditioning system or an automatic air conditioner with a further function with which the residual heat of the engine can be utilized to heat the interior of the vehicle. Here, in a manner comparable to the heat exchanger of a conventional heater of a vehicle, heat is then obtainable from the coolant of the engine. With this function, the residual heat of the engine is utilized when the engine is not operating. In the prior art, the on/off switch of the air-conditioning system or automatic air conditioner and the switch for the residual heat utilization function are different (i.e., separate) switches.

It is an object of the present invention to provide a circuit arrangement for actuating an air-conditioning system or automatic air conditioner in a manner such that its control is simplified and the expenditure (in terms of components) is minimized.

This and other objects and advantages are achieved by the circuit arrangement according to the invention, in which at least one function of the air-conditioning system or automatic air conditioner, which is manually switchable when the engine is operating, is switchable via the same control element utilized to activate and deactivate the function of utilizing the residual heat when the engine is stationary.

Here, in comparison to the prior art, an advantage is achieved by eliminating the use of one control element. Since the air-conditioning system or automatic air conditioner is switched off automatically when the engine is switched off, the control element with which the at least one manually switchable function can be switched on or off when the engine is operating can be used (when the engine is stationary(off)) to switch the function in which the residual heat is utilized. This is because at least one function can be switched only when the engine is operating. On the other hand, the function of utilizing the residual heat can be switched only if the engine is not operating. As a result, via this double assignment of the control element, in comparison to the prior art, it is possible to eliminate the use of one control element.

In an embodiment of the circuit arrangement according to the invention, the at least one function of the air-conditioning system or automatic air conditioner, which is manually switchable when the engine is operating, is the activation and deactivation of the air-conditioning system or automatic air conditioner when the engine is operating.

Via this refined embodiment of the invention, the use is simplified insofar as one control element is provided with which different functions can be switched on or off. This proves advantageous insofar as, in the two cases in which the engine is operating and in which the engine is switched off, this control element has a switching-on and switching-off function, i.e., in the switching on/off of the air-conditioning system or automatic air conditioner, and in the other case the switching on/off of the function where the residual heat of the engine is utilized. Therefore, by virtue of the fact that the control element is not used to set any variables, but rather a switching on/off function is implemented, the device is simple for the user to operate (in terms of the control). This is particularly advantageous in view of the comparatively large number of control elements of an air-conditioning system and an automatic air conditioner.

In another embodiment of the circuit arrangement according to the invention, the control element is a switch. In a switch, haptic feedback (i.e., information learned by touching the switch) of the switched state is easily provided. This enables the user to determine which switched state the switch is in.

In yet another embodiment of the circuit arrangement according to the invention, the control element is a pushbutton switch. The actuation of a pushbutton switch can be input by a controller or microprocessor in a simple manner. This is advantageous insofar as it is in any case necessary to use a controller or microprocessor for the open-loop or closed-loop control of the air-conditioning system or automatic air conditioner. Here, in an advantageous manner, it is possible to feed into the controller or microprocessor the external signals in a particularly simple way when pushbutton switches are used.

In a still further embodiment of the circuit arrangement according to the invention, there is at least one display element with which it is possible to display which of the functions can be switched by the control element. As a result, the operation of the device by the user becomes easier. This is because it is always possible to determine which of the functions can be switched via the control element. For example, in each case a designation of the two switchable functions can be printed onto the control element itself. Assignable to each of these designations is a light-emitting diode. Here, the light-emitting diodes is driven in accordance with the operating state of the engine. As a result, it is always possible to determine which function can be switched. Additionally, it is also possible to provide a corresponding display in a display device. Further, the control circuit arrangement can be implemented via software, hardware or some combination thereof, with reference to the controller or microprocessor.

Other objects, advantages and novel features of the present invention will become apparent from the following detailed description of the invention when considered in conjunction with the accompanying drawings.

DETAILED DESCRIPTION OF THE DRAWINGS

Figure 1:
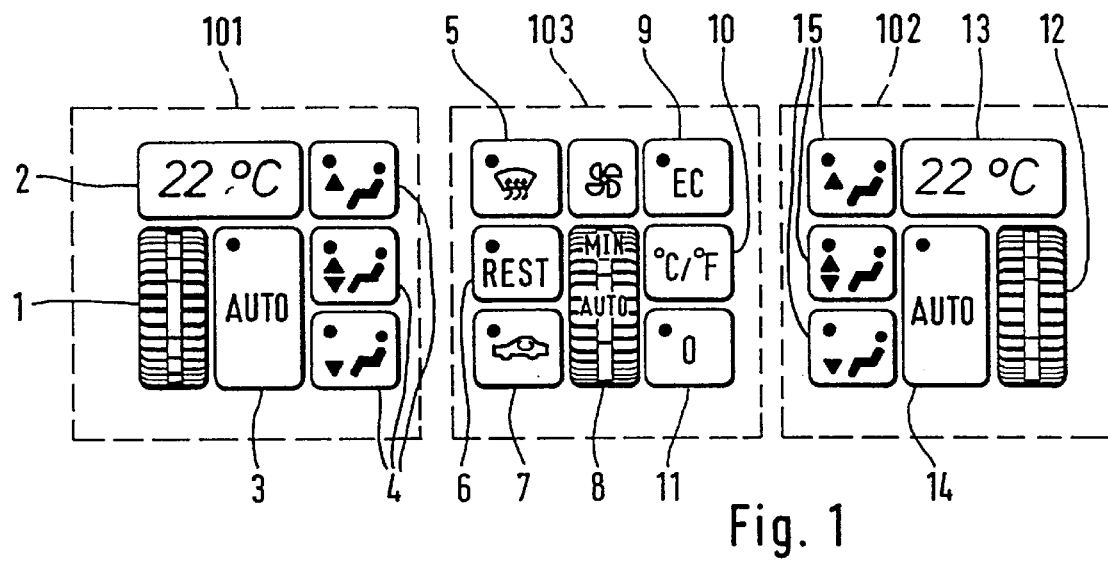
FIG. 1 shows the view of an array of keys for controlling an automatic air conditioner.

FIG. 1 shows the view of an array of keys, known from the prior art, for controlling an automatic air conditioner. The control elements with the numbers 1 to 4 and 12 to 15 in the fields 101 and 102 are used for individually setting a temperature setpoint and to also direct the flow of air for each side of the vehicle. In addition to other control elements which are provided in the field 103, there are also two control elements 6 and 11. These can be used to switch the function (previously described) where the residual heat of the engine is utilized (control element 6) and the switching on/off of the automatic air conditioner can be performed when the engine is operating (control element 11).

Figure 2:
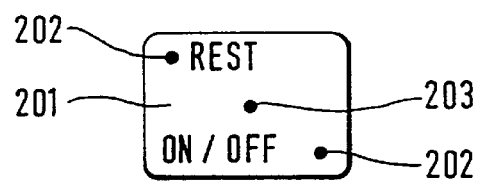
FIG. 2 shows a control element with which two functions can be switched according to the invention.

FIG. 2 shows a control element 201 which may be designed as a key. The designations of the functions which can be switched with this key 201 are printed onto this key 201. Here, ("REST" represents the function where the residual heat of the engine is utilized and "ON/OFF" represents the switching on/off of the automatic air conditioner). Further, FIG. 2 shows that these designations may be assigned light-emitting diodes 202, respectively. These light-emitting diodes display which of the functions can be switched via the key 201 as a result of lighting them in a corresponding manner. The light-emitting diode 202 assigned to the designation "REST" is lit when the engine is not operating. The light-emitting diode assigned to the designation "ON/OFF" is lit when the engine is operating. These light-emitting diodes may be colored, for example, yellow.

A further light-emitting diode 203 which is driven when the respective function is switched on (i.e., utilization of residual heat or switching on the automatic air conditioner) is advantageously provided. This light-emitting diode 203 is advantageously provided in a different color, such as green, for example.

Figure 3:
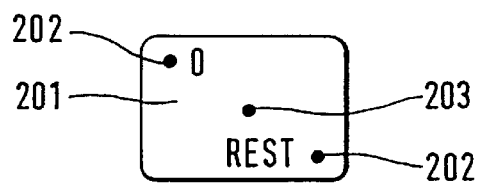
FIG. 3 shows a refinement of the control element according to FIG. 2.

FIG. 3 shows a refinement of the control element according to FIG. 2. Here, instead of the labeling ON/OFF, the switching-on/switching-off function is designated with the symbol "0". This symbol occupies less space than the labeling ON/OFF. As a result, accommodation of this labeling on a control element is improved. Furthermore, the labeling can be more easily understood by the user. This is particularly advantageous if the user is the driver of the vehicle, because he should be distracted as little as possible from events that occur on the road while driving. In FIG. 3, identical reference symbols designate the same elements shown in FIG. 2. It thus becomes apparent that the control elements 6 and 11, as provided in the prior art, are combinable into one control element in accordance with FIG. 2 and/or 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circuit arrangement for actuating one of an air-conditioning and automatic air conditioner system in a vehicle, in which the system is switchable on and off when an engine of the vehicle is operating;

wherein if the system is operating while the engine is operating, the system is switched off when the engine is switched off; and wherein the system continues to possess a function with which, when the engine of the vehicle is off, a residual heat function of the engine is utilizable; and a control element used to activate and deactivate the residual heat function when the engine is off, the control element also being used to operate at least one function of the system which is manually switchable when the engine is operating.

2. The circuit arrangement according to claim 1, wherein the at least one function of the manually switchable system when the engine is operating, is an activation and deactivation of the system when the engine is operating.

3. The circuit arrangement according to claim 1, wherein the control element is a switch.

4. The circuit arrangement according to claim 2, wherein the control element is a switch.

5. The circuit arrangement according to claim 1, wherein the control element is a pushbutton switch.

6. The circuit arrangement according to claim 2, wherein the control element is a pushbutton switch.

7. The circuit arrangement according to claim 1, further comprising:

at least one display element for displaying which function is switchable via the control element.

8. The circuit arrangement according to claim 2, further comprising:

at least one display element for displaying which function is switchable via the control element.

9. The circuit arrangement according to claim 3, further comprising:

at least one display element for displaying which function is switchable via the control element.

10. The circuit arrangement according to claim 4, further comprising:

at least one display element for displaying which function is switchable via the control element.

11. A method of operating one of an air-conditioning and automatic air conditioner system in a vehicle having a residual heat function, comprising the acts of:

deactivating the system when the engine is switched off, if the system is operating while the engine is operating; and switching with a same control element used to activate and deactivate the residual heat function when the engine is off, at least one function of the system which is manually switchable when the engine is operating.

12. The method according to claim 11, wherein the at least one function of the manually switchable system when the engine is operating, is an activation and deactivation of the system when the engine is operating.

13. The method according to claim 11, further comprising the act of:

displaying which function is switchable via the control element using at least one display element.

14. The method according to claim 12, further comprising the act of:

displaying which function is switchable via the control element using at least one display element.

15. A software product, comprising:

a computer readable medium having stored thereon program code segments that:

deactivate one of an air-conditioning or automatic air condition system in a vehicle when an engine of the vehicle is switched off, if the system is operating while the engine is operating;

continuously provide the system with a function which, when the engine of the vehicle is off, utilizes residual heat of the engine; and switch via a same control element used to activate and deactivate the residual heat when the engine is off, at least one function of the system, which is manually switchable when the engine is operating.

16. A control unit for an air-conditioning or automatic air conditioner system having residual heat capability, comprising:

a single control element which is operable to activate and deactivate the residual heat when an engine is off, and to activate and deactivate at least one function of the air-conditioning or automatic air conditioner system when the engine is on.

* * * * *